United States Patent [19]
Duncan et al.

[11] 3,978,678
[45] Sept. 7, 1976

[54] METHOD AND APPARATUS FOR PLUGGING A PIPELINE

[75] Inventors: Anthony B. Duncan, Missouri City; Arthur H. T. Chin, Houston, both of Tex.

[73] Assignee: HydroTech International, Inc., Houston, Tex.

[22] Filed: Oct. 14, 1975

[21] Appl. No.: 622,038

[52] U.S. Cl. .......................... 61/112; 15/104.06 A; 138/89; 220/316
[51] Int. Cl.² ..................... F16L 1/04; B63B 35/04
[58] Field of Search .......................... 61/72.1, 72.3; 15/104.06 A; 138/89; 220/316

[56] References Cited
UNITED STATES PATENTS

| | | | |
|---|---|---|---|
| 3,751,932 | 8/1973 | Matthews, Jr. | 61/72.3 |
| 3,788,084 | 1/1974 | Matthews, Jr. | 61/72.3 |
| 3,842,612 | 10/1974 | Arnold | 138/89 |

*Primary Examiner*—Paul R. Gilliam
*Assistant Examiner*—Alex Grosz

[57] ABSTRACT

Method and apparatus for plugging a dry section of a pipeline in response to an influx of water into another section thereof while the pipeline is being laid on a sea bottom comprising; a carriage disposed in the pipeline and including a partition having forward and rearward sides with the forward side being exposed to water which may enter the other pipeline section; means for effecting a seal between the internal wall of the pipeline and the carriage; means for disengageably engaging the internal wall of the pipeline to lock the carriage against movement relative thereto, and means responsive to an influx of water into the other pipeline section on the forward side of the partition to procure actuation of the seal means and the engaging means independently of the partition to sealably lock the carriage in the pipeline with consequent plugging of the first mentioned pipeline section.

17 Claims, 5 Drawing Figures

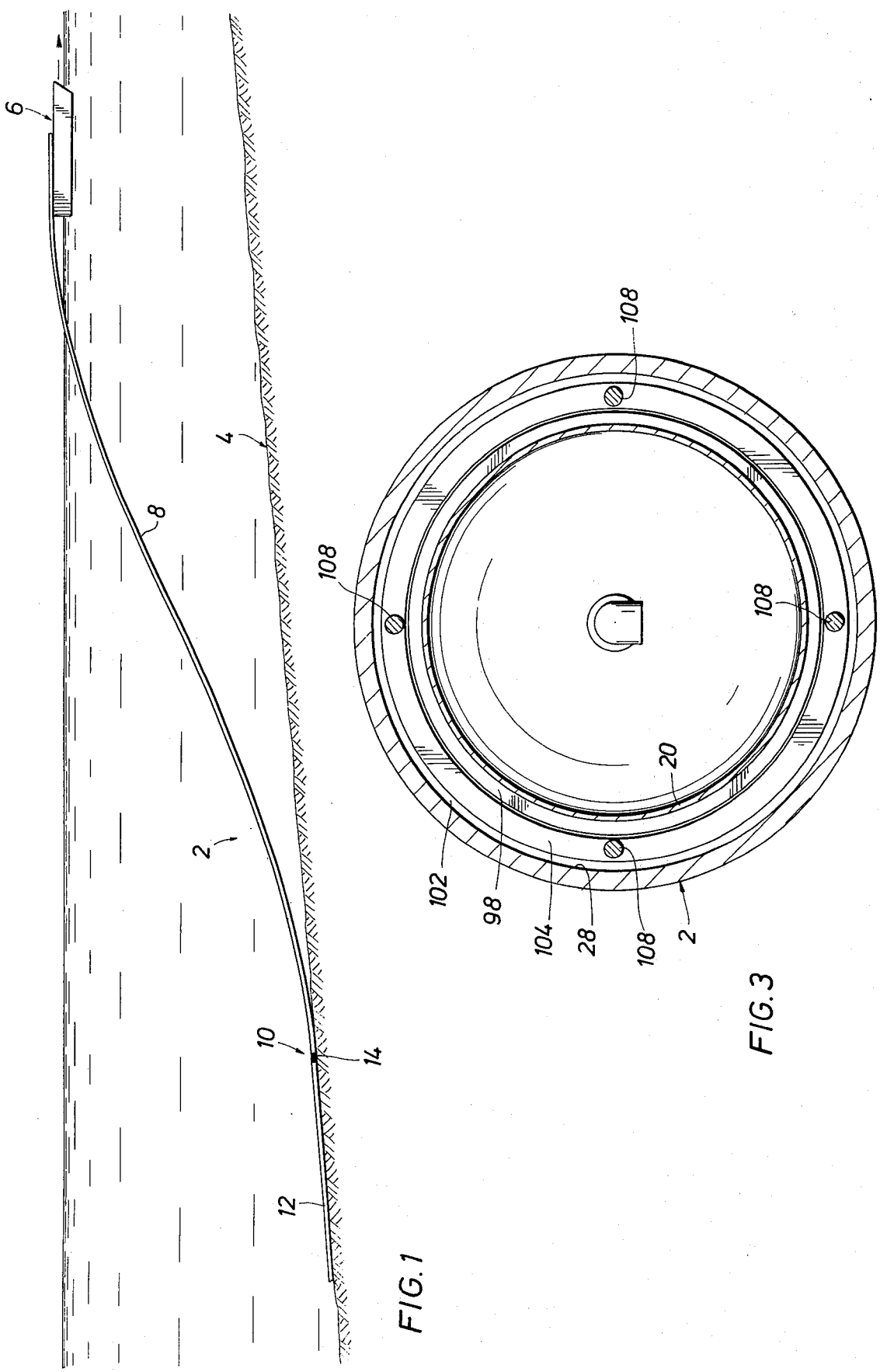

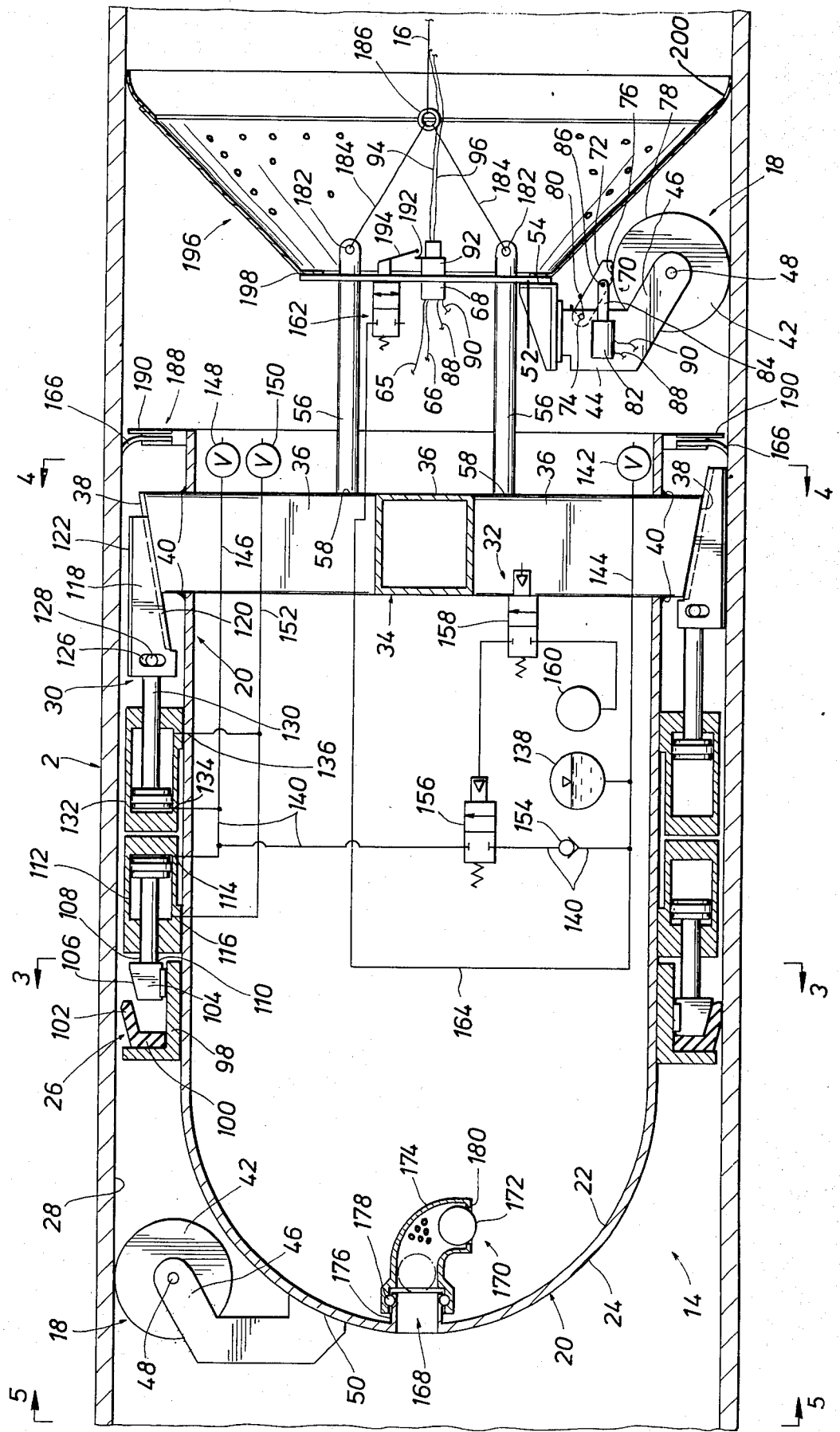

3,978,678

METHOD AND APPARATUS FOR PLUGGING A PIPELINE

BACKGROUND OF THE INVENTION a. Field of the Invention

This invention relates broadly to the laying of a pipeline on a sea bottom. In particular, the invention has regard to method and apparatus for plugging a dry section of the pipeline in response to an influx of water into another section thereof while the pipeline is being laid on sea bottom.

b. Description of the Prior Art

Ordinarily, the laying of a pipeline on a deep sea bottom constitutes connecting a plurality of pipe sections together in end-to-end relationship on a work barge and subsequently lowering the connected sections into the water in a step-by-step manner as the work barge moves towards the direction in which the pipeline is to be laid. In that event, the pipeline forms a catenary between the sea bottom and the work barge which is very susceptible to buckling and breakage. Should breakage occur the previously laid section of the pipeline on sea bottom will of course become flooded with water; this being a major drawback, particularly when the pipeline has to be raised to the water surface for the continuation of the pipelaying operation. That is to say, before the pipeline can be raised to the surface the damaged end of the pipeline must be cut off on sea bottom and the pipeline dewatered with a plugging device to reduce the stresses on the pipeline during the raising thereof. Needless to say, any dewatering operation is time consuming and expensive.

SUMMARY OF THE INVENTION

Accordingly, it is a broad object of the present invention to provide method and apparatus for plugging a dry section of a pipeline in response to an influx of water into another section thereof.

A related object of the present invention is to provide method and apparatus for use in pipe laying operations which obviates the need for dewatering the previously laid section of the pipeline on sea bottom.

To achieve the foregoing and other obvious objects of the invention, both stated and unstated hereinafter, the invention provides apparatus for plugging a dry section of a pipeline in response to an influx of water into another section thereof while the pipeline is being laid on a sea bottom comprising a carriage disposed in the pipeline and including a partition having forward and rearward sides with the forward side being exposed to water which may enter the other pipeline section; means for effecting a seal between the internal wall of the pipeline and the carriage; means for disengageably engaging the internal wall of the pipeline to lock the carriage against movement relative thereto, and means responsive to an influx of water into the other pipeline section on the forward side of the partition to procure actuation of the seal means and the engaging means independently of the partition to sealably lock the carriage in the pipeline with consequent plugging of the first mentioned pipeline section.

In a correspondingly broad aspect the invention provides a method of preventing a pipeline from filling with water during the laying of the pipeline from a work barge by connecting a plurality of pipe sections together in end-to-end relationship and subsequently lowering the pipe sections sequentially in a step-by-step manner towards the sea bottom comprising the steps of; providing a plugging device having a partition and means responsive to an influx of water into the pipeline to procure actuation of the plugging device independently of the partition to inhibit water from flowing by the plugging device, and a tow line attached by one end thereof to the plugging device; disposing the plugging device in the pipeline at sea bottom with the other end of the tow line being retained at the work barge whereby an influx on water into the pipeline between the plugging device and the work barge will actuate the plugging device to prevent the pipeline from filling with water, and pulling on the tow line by the other end thereof after each pipe section is lowered into the water to thereby selectively move the plugging device into position at the sea bottom.

Other objects of the invention more or less broad than the foregoing will become apparent from the hereinafter following description of the elements, parts and principles of the invention given herein solely by way of example and with reference to the accompanying drawings wherein like reference numerals refer to like parts of the invention.

BRIEF DESCRIPTION OF THE DRAWINGS

FIG. 1 is an elevational view of a pipeline being laid from a work barge with the plugging device being located in position at sea bottom;

FIG. 2 is an elevational view in cross-section of the plugging device located in a pipeline;

FIG. 3 is a cross-sectional view of the plugging device taken along line 3—3 in FIG. 2 and showing the lip seal member in its wall engaging position;

DESCRIPTION OF THE PREFERRED EMBODIMENT

Figure 4:
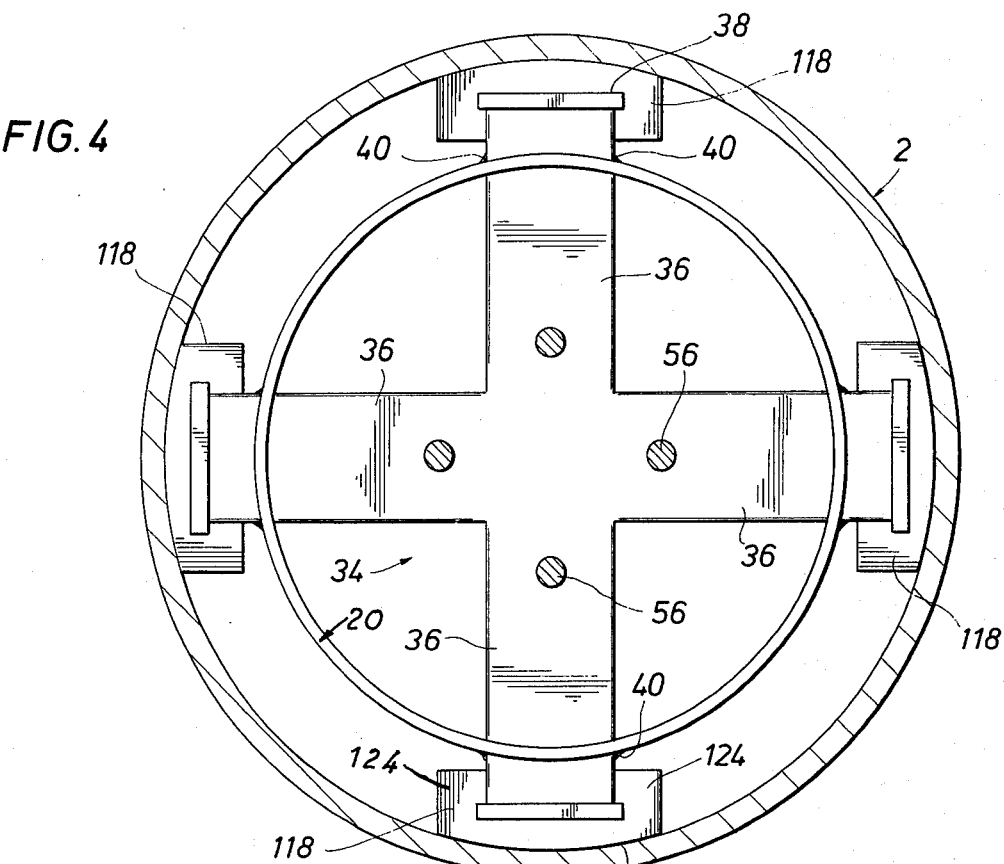
FIG. 4 is a cross-sectional view of the plugging device taken along line 4—4 in FIG. 2 and showing the slips in their extended position.

FIG. 1 illustrates a pipeline 2 being laid on a sea bottom 4 from a work barge 6 as the latter moves towards the direction in which the pipeline is to be laid and exemplified by the arrow appearing in the same view; it being recognized that pipeline 2 forms a catenary 8 defined between work barge 6 and sea bottom 4 as at 10 which is very susceptible to buckling and breakage. Should breakage occur the previously laid pipeline section 12 on sea bottom 4 will become flooded with water as hereinbefore stated.

Accordingly, the invention as visualized herein provides apparatus 14 for plugging the previously laid dry pipeline section 12 in response to an influx of water into catenary 8 while pipeline 2 is being laid on sea bottom 4; apparatus 14 being connected to a tow line 16 (FIG. 2) for purposes which will appear. More particularly, the preferred embodiment of plugging apparatus 14 is shown in FIG. 2 and comprises a carriage 18 disposed in pipeline 2 at 10 — i.e. in position between pipeline section 12 and catenary 8 as best shown in FIG. 1; carriage 18 including a partition 20 having forward and rearward sides 22 and 24, respectively with forward side 22 being exposed to water which may enter pipeline catenary 8. In addition, apparatus 14 includes means 26 for effecting a seal between an internal wall 28 of pipeline 2 and carriage 18 as well as means 30 for disengageably engaging internal wall 28 to lock carriage 18 against movement relative thereto. Further, apparatus 14 includes means 32 responsive to an influx of water into catenary 8 on forward side 22 of partition 20 to procure actuation of seal means 26 and locking means 30 independently of partition 20 to sealably lock carriage 18 in pipeline 2 with consequent plugging of pipeline section 12.

Figure 5:
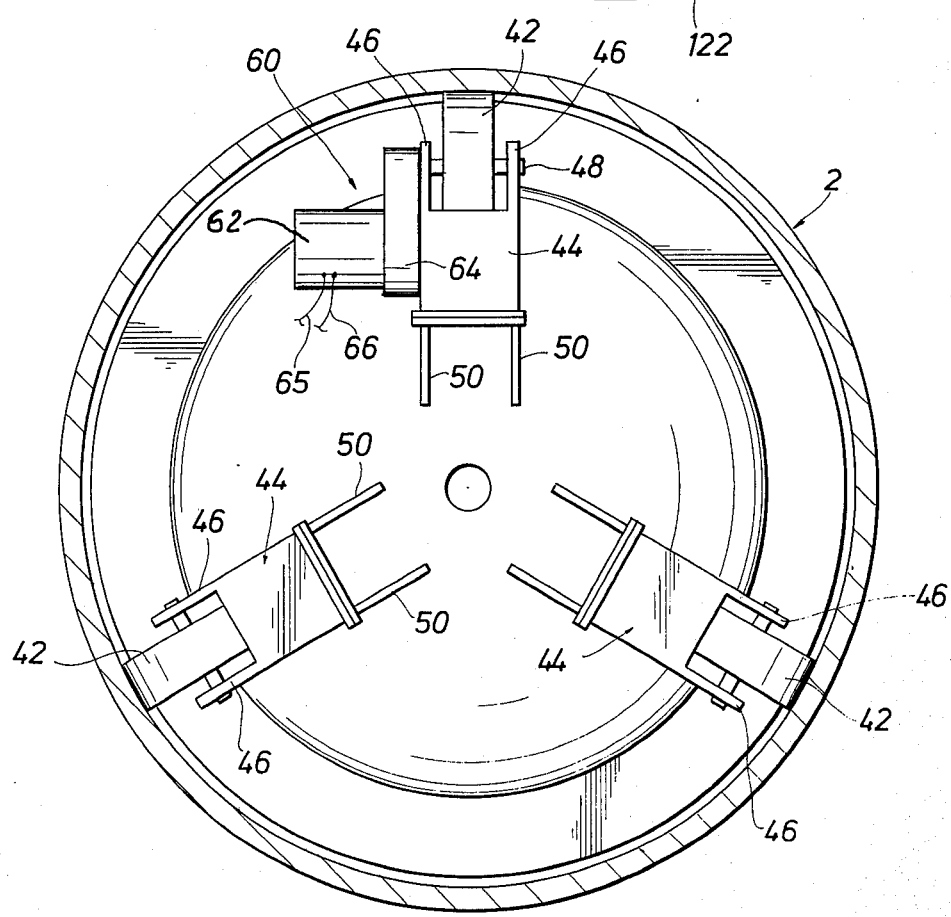
FIG. 5 is a cross-sectional view of the plugging device taken along line 5—5 in FIG. 2.

With more particular regard now to carriage 18, FIG. 4 illustrates it to include in this preferred embodiment a cross-frame 34 having legs 36 terminating in outer tapered surfaces 38 (FIG. 2) for reasons which will become obvious; cross-frame 34 serving to support partition 20, the latter being in the form of a bowl-shaped structural member surrounding each leg 36 and welded thereto as at 40. In addition, carriage 18 includes two sets of tires or castors 42 at the forward and rearward ends thereof to facilitate movement of carriage 18 within pipeline 2 as well as to center carriage 18 therein. More specifically, each castor set includes a plurality of circumferentially spaced forks 44 (FIG. 5) having spaced prongs 46—46 between which are journalled castors 42 as at 48. In the case of the rearward castor set, each fork 44 is affixed to rearward side 24 as at 50. In the case of the forward castor set, each fork 44 (one being shown) is affixed to a plate 52 as at 54 (FIG. 2). Plate 52 in turn is rigidly attached to a plurality of props 56 extending from and fixed to cross-frame 34 at 58. Moreover, the invention visualizes providing means 60 (FIG. 5) for driving at least one of the castors 42 to selectively move carriage 18 in pipeline 2 between work barge 6 and sea bottom 4. To this end, an electrical drive motor 62 (FIG. 5) is provided for driving a gear box 64 which in turn is operably connected to rearward castor 42 to drive the latter clockwise as shown in FIG. 2 in a conventional manner; motor 62 having conductors 65 and 66 which are suitably connected to electrical socket 68 mounted on plate 52. For reasons which will be made clear, means 70 (FIG. 2) are provided for selectively braking at least one of castors 42 to resist rearward movement of carriage 18. In particular, braking means 70 include a pawl 72 pivotally attached to a fork 44 as at 74; pawl 72 including a braking surface 76 which is engaged with rim 78 of forward castor 42 shown in FIG. 2 to thereby resist counterclockwise movement thereof and hence, rearward movement of carriage 18. A torsion spring 80 is suitably connected between fork 44 and pawl 72 to keep braking surface 76 in engagement with rim 78. In order for drive motor 62 to achieve its function however, — i.e. to drive rearward castor 42 as shown in FIG. 2 in a clockwise direction, braking means 70 must be temporarily disengaged from castor rim 78. Accordingly, the invention visualizes a solenoid 82 suitably mounted on fork 44 and having one end 84 pivotally mounted to pawl 72 as at 86. Solenoid 82 when energized serves to overcome the resistance of torsion spring 80 and thereby move pawl 72 counterclockwise (as shown in FIG. 2) out of engagement with castor rim 78; solenoid 82 having conductors 88 and 90 which are suitably connected to socket 68 in series with motor conductors 65 and 66. Socket 68 in turn is disengageably engaged with an electrical plug 92 having conductors 94 and 96 extending through tow line 16 to work barge 6 where a power source and controls are provided (not shown). Thus it will be understood that solenoid 82 and drive motor 62 will be energized simultaneously enabling carriage 18 to be driven within pipeline 2 to the end 10 of catenary 8. In the latter position, solenoid 82 and drive motor 62 will then be deenergized to thereby enable pawl surface 76 to assume its rim engaging position. Of course, it will be further understood that castor 42 of the forward castor set shown in FIG. 2 will thereafter be capable of moving in a clockwise direction to enable carriage 18 to move in a forward direction by pulling on tow line 16.

With reference to seal means 26, it includes an annular guide member 98, L-shaped in cross-section (upper half of FIG. 2) which is fixed to rearward side 24 and serves to support an annular elastomeric seal 100 including a lip member 102 which is capable of being wedged into sealing engagement with internal wall 28 of pipeline 2. To effect such wedging engagement the invention visualizes an annular ring 104 (FIG. 3) having an outer tapered surface 106 capable of wedging lip member 102 into sealing engagement with internal wall 28 as aforesaid. More specifically, ring 104 is attached to a plurality of pistons 108 as at 110; pistons 108 being housed in cylinders 112 having spaced ports 114 and 116 for passage of pressurized fluid in a conventional manner. Cylinders 112 in turn are fixed to rearward side 24. Thus it will be understood that when pistons 108 and 104 are moved to a retracted position (upper half of FIG. 2) lip seal member 102 is disengaged from internal wall 28 of pipeline 2. Conversely, when pistons 108 and ring 104 are moved to an extended position (lower half of FIG. 2) lip seal member 102 is wedged into engagement with internal wall 28 to effect a seal as aforesaid.

With more particular attention to locking means 30, the invention visualizes a plurality of slips 118 having inner tapered sufaces 120 (FIG. 2) which are mateably engaged with tapered surfaces 38 of cross-frame 34 and outer gripping surfaces 122 which are preferably circular in shape (FIG. 4) to conform to the contour of internal wall 28, slips 118 including spaced retainer guides 124—124 disposed on opposite sides of legs 36 to maintain slips 118 in mating engagement with tapered surfaces 38. In addition, slips 118 includes slots 126 within which are disposed pins 128 to effect attachment of slips 118 with a plurality of pistons 130; slots 126 enabling slips 118 to move transversely relative to pistons 130 for setting and unsetting purposes. Pistons 130 in turn are housed in cylinders 132 which are fixed to rearward side 24; cylinders 132 having spaced ports 134 and 136 for passage of pressurized fluid in a conventional manner.

Accordingly, it will be understood that when pistons 130 and slips 118 are moved to a retracted position (upper half of FIG. 2) gripping surfaces 122 are disengaged from internal wall 28 to enable carriage 18 to move within pipeline 2. Conversely, when pistons 130 and slips 118 are moved to an extended position (lower half of FIG. 2) gripping surfaces 122 are engaged with internal wall 28 to lock carriage 18 against movement relative thereto.

Turning now to actuating means 32, FIG. 2 illustrates schematically an accumulator 138 for providing pressurized fluid to ports 114 and 134 via conduit 140 to effect movement of pistons 108 and 130 to the extended position in an understood manner. Preferably, valve 142 is provided to selectively charge or dump accumulator 138 via conduit 144. Tapped into conduit 140 via conduit 146 is a dump valve 148 for selectively relieving the pressurized fluid in cylinders 112 and 132 through ports 114 and 134, respectively. Another dump valve 150 is also provided to selectively relieve pressurized fluid in cylinders 112 and 132 through ports 116 and 136, respectively via conduit 152. Disposed in series with conduit 140 between accumulator 138 and ports 114 and 134 are a check valve 154 and an actuator valve 156 which actually releases the pressurized fluid in accumulator 138 to ports 114 and 134. Actuator valve 156 in turn is operably connected to a pressure sensor valve 158, the latter being sensitive to a pressure surge in pipeline 2 on the forward side 22 of carriage 18 due to an influx of water into catenary 8 to procure opening of actuator valve 156 with the aid of a pressurized air supply in flask 160, for example. For reasons which will appear, a dump valve 162 is tapped into conduit 140 between check valve 154 and accumulator 138 via conduit 164 for selectively dumping the pressurized fluid in accumulator 138 to insure that the plugging apparatus 14 does not set.

Accordingly, it will be understood that with valve 150 open and with valves 142,148,156,158 and 162 closed plugging apparatus 14 is in its normal unset position (upper half of FIG. 2). However, should there be a break in catenary 8 and an influx of water therein, the water will of course cause a pressure surge against forward side 22. In that event, sensor valve 158 will be activated enabling the pressurized air in flask 160 to be released to open valve 156 and thereby energize cylinders 112 and 132 with consequent setting of seal means 26 and locking means 30 (lower half of FIG. 2).

Preferably, in order to insure that there will be a pressure surge of sufficient proportions to activate sensor valve 158, the invention visualizes carriage 18 to include an annular wiper seal 166 (FIG. 2) supported thereon; wiper seal 166 being in continuous engagement with internal wall 28 to cooperate with partition 20 to effect a seal between the wall 28 and carriage 18.

Referring once again to said partition 20, FIG. 2 illustrates it to include a vent 168 and means 170 responsive to an accumulation of water on forward side 22 of partition 20 for closing vent 168 to prevent water from flowing by partition 20 and into dry pipeline section 12. For all intents and purposes vent 168 permits passage of air through partition 20 under normal operating conditions — i.e. when carriage 18 is being selectively moved in a forward direction by pulling on tow line 16 with seal means 26 and locking means 30 in the unset position. Otherwise stated, under normal operating conditions vent 168 serves to prevent a surge in pressure on the forward side 22 of partition 20 and, hence, inadvertent activation of pressure sensor valve 158. However, should there be an influx of water into catenary 8, closing means 170 will close vent 168 enabling a surge in pressure to activate sensor valve 158 as aforesaid. In this embodiment, closing means 170 includes a float 172 larger than vent 168 and housed in a perforated, curved cage 174 as best shown in FIG. 2; cage 174 being rotatably engaged at one end thereof with a circular vent defining wall 176 as at 178 and including at the other end thereof an inner lip 180 for retaining float 172 therein. Accordingly, it will be understood that under normal operating conditions float 172 will be gravity held in the solid line position to permit air to flow through cage 174 and out vent 168. On the other hand, should there be an accumulation of water on forward side 22 float 172 will ride the surface of the water to assume its dotted line position (FIG. 2) where it is in occluding relation with vent 168 to close it and thereby permit a surge in pressure to activate sensor valve 158 as aforesaid.

It will be recalled that tow line 16 is connected to apparatus 14. To this end, carriage 18 includes eyelets 182—182 through which opposite ends of a bridle 184 are threaded and secured; bridle 184 in turn being attached to one end of tow line 16 by weak linkage 186, the latter serving to enable tow line 16 to separate from carriage 18 without breaking in response carriage 18 being trapped in pipeline 2. It is contemplated that such entrapment may result from a buckle being detected in pipeline 2 as carriage 18 is pulled therethrough by tow line 16. To aid in detecting a buckle, the invention visualizes means 188 for gauging the ovality of pipeline 2. In particular, gauging means 188 is constituted in this embodiment by a circular ring 190 fixed to carriage 18; ring 190 having an external diameter slightly smaller than the internal diameter of pipeline 2. Thus it will be understood that should pipeline 2 have a buckle, it will be detected by ring 190 as carriage 18 is pulled by tow line 16 through pipeline 2. In that event, carriage 18 will become trapped whereby extended pulling on tow line 16 will break weak linkage 186 to enable tow line 16 to separate from carriage 18 and be retrieved. During such separation plug 92 will also become disengaged from socket 68 on carriage plate 52. In so doing, a tab 192 fixed to plug 92 will activate a lever 194 on dump valve 162 to open it and thereby dump the pressurized fluid in accumulator 138 to insure that plugging apparatus 14 does not set as aforesaid. This enables plugging apparatus 14 to be easily removed from pipeline 2 after the latter has been raised to the surface to replace the buckled pipe section. Braking means 70 will prevent carriage 18 from moving in a rearward direction while pipeline 2 is being raised.

Under certain circumstances, debris or other foreign matter may be left in pipeline 2 as the pipe sections are connected together on work barge 6. Accordingly, the invention visualizes apparatus 14 as including a circular basket 196 attached to plate 52 as at 198 for gathering foreign matter in pipeline 2 when carriage 18 is pulled in a forward direction; basket 196 having an elastomeric outer lip 200 and perforations to enable forward side 22 to be exposed to water as aforesaid.

In operation, plugging apparatus 14 in its unset condition is initially inserted into the end of pipeline 2 on work barge 6. Thereafter, solenoid 82 and drive motor 62 are energized enabling plugging apparatus 14 to be driven within pipeline 2 to the end 10 of catenary 8. In the meantime, tow line 16 is of course payed out from work barge 6 as plugging apparatus 14 is driven by motor 62. Once plugging apparatus 14 reaches the end 10 of catenary 8 which can be estimated by the length of tow line 16 payed out from work barge 6, then motor 62 and solenoid 82 are deenergized whereupon the pipelaying operation is resumed — i.e. connecting a plurality of pipe sections together in end-to-end relationship and subsequently lowering the pipe sections sequentially in a step-by-step manner towards sea bottom 4 as is known in the art. After each connected pipe section is lowered into the water however, tow line 16 is pulled at work barge 6 to move plugging apparatus 14 in a forward direction a distance which approximates the length of the pipe section so lowered. Such periodic movement serves to reposition plugging apparatus 14 so that it is once again at or near catenary end 10.

In the event of an influx of water into catenary 8, then plugging apparatus 14 will become actuated to thereby plug dry pipeline section 12 as aforesaid.

What is claimed is:

1. Apparatus for plugging a dry section of a pipeline in response to an influx of water into another section thereof while the pipeline is being laid on a sea bottom comprising;
    a carriage disposable in said pipeline and including a partition having forward and rearward sides with said forward side being exposable to water which may enter said other pipeline section;
    means operably associated with said carriage for effecting a seal between the internal wall of said pipeline and said carriage;
    means operably associated with said carriage for disengageably engaging the internal wall of said pipeline to lock said carriage against movement relative thereto, and
    means operably associated with said carriage responsive to an influx of water into said other pipeline section on the forward side of said partition to procure actuation of said seal means and said engaging means independently of said partition to sealably lock said carriage in said pipeline with consequent plugging of said first mentioned pipeline section.

2. Apparatus as defined in claim 1 wherein:
    said partition includes a vent for passage of air therethrough, and
    means responsive to an accumulation of water in said other pipeline section on the forward side of said partition for closing said vent to prevent water from flowing by said partition and into said first mentioned pipeline section.

3. Apparatus as defined in claim 1 wherein:
    said carriage includes a plurality of castors disposed to center said carriage in said pipeline.

4. Apparatus as defined in claim 3 and further including;
    means for selectively braking at least one of said castors to resist rearward movement of said carriage.

5. Apparatus as defined in claim 1 wherein:
    said locking means includes slips and means for moving said slips between the pipe engaged and disengaged positions aforesaid, said moving means being operably connected to said actuating means.

6. Apparatus as defined in claim 5 wherein:
    said slips comprise at least two in number which are diametrically opposed relative to each other, each said slip including a tapered surface slidably engaged with a like tapered surface on a frame of said carriage.

7. Apparatus as defined in claim 1 wherein:
    said seal means includes an annular elastomeric lip member and means for urging said lip member towards sealing engagement with the internal wall of said pipeline, said urging means being operably connected to said actuating means.

8. Apparatus as defined in claim 1 and further including:
    a tow line attached by one end thereof to said carriage with the other end thereof being disposable at the water surface for selectively drawing said carriage in a forward direction.

9. Apparatus as defined in claim 8 wherein:
    said tow line is attached to said carriage by weak linkage enabling said tow line to separate from said carriage without breaking in response to said carriage being trapped in said pipeline.

10. Apparatus as defined in claim 1 and further including
    a basket attached to said carriage for gathering foreign matter in said pipeline when said carriage is drawn in a forward direction.

11. Apparatus as defined in claim 10 wherein:
    said basket is perforated to permit said forward side to be exposable to water as aforesaid.

12. Apparatus as defined in claim 1 and further including:
    means for gauging the ovality of said pipeline to thereby detect a buckle therein while it is being laid on a sea bottom as aforesaid.

13. Apparatus as defined in claim 1 and further including:
    an annular wiper seal for continuously engaging the internal wall of said pipeline to enable a build-up of water on the forward side of said partition in response to an influx of water in said other pipeline section as aforesaid.

14. Apparatus as defined in claim 2 wherein:
    said closing means includes a float movable by the water into occluding relationship with said vent to close the latter as aforesaid.

15. Apparatus as defined in claim 3 and further including:
    means for driving at least one of said castors to selectively move said carriage in said pipeline.

16. In a method of preventing a pipeline from filling with water during the laying of the pipeline from a work barge by connecting a plurality of pipe sections together in end-to-end relationship and subsequently lowering said pipe sections sequentially in a step-by-step manner towards the sea bottom, the combination of steps comprising;
    providing a plugging device having a partition and means responsive to an influx of water in said pipeline to procure actuation of said plugging device independently of said partition to inhibit water from flowing by said plugging device, and a tow line attached by one end thereof to said plugging device;
    disposing said plugging device in said pipeline at said sea bottom with the other end of said tow line being retained at said work barge whereby an influx of water into said pipeline between said plugging device and said work barge will actuate said plugging device to prevent said pipeline from filling with water, and
    pulling on said tow line by the other end thereof after each pipe section is lowered into the water to thereby selectively move said plugging device into position at said sea bottom.

17. A method as defined in claim 16 and further including the step of:
    providing a closable vent in said plugging device for passage of air therethrough when said plugging device is moved into position at said sea bottom by pulling on said tow line as aforesaid.

* * * * *